Feb. 10, 1953 C. A. BLAKESLEE 2,628,149
MULTIPLE-POINT MEASURING INSTRUMENT
Filed Aug. 17, 1948
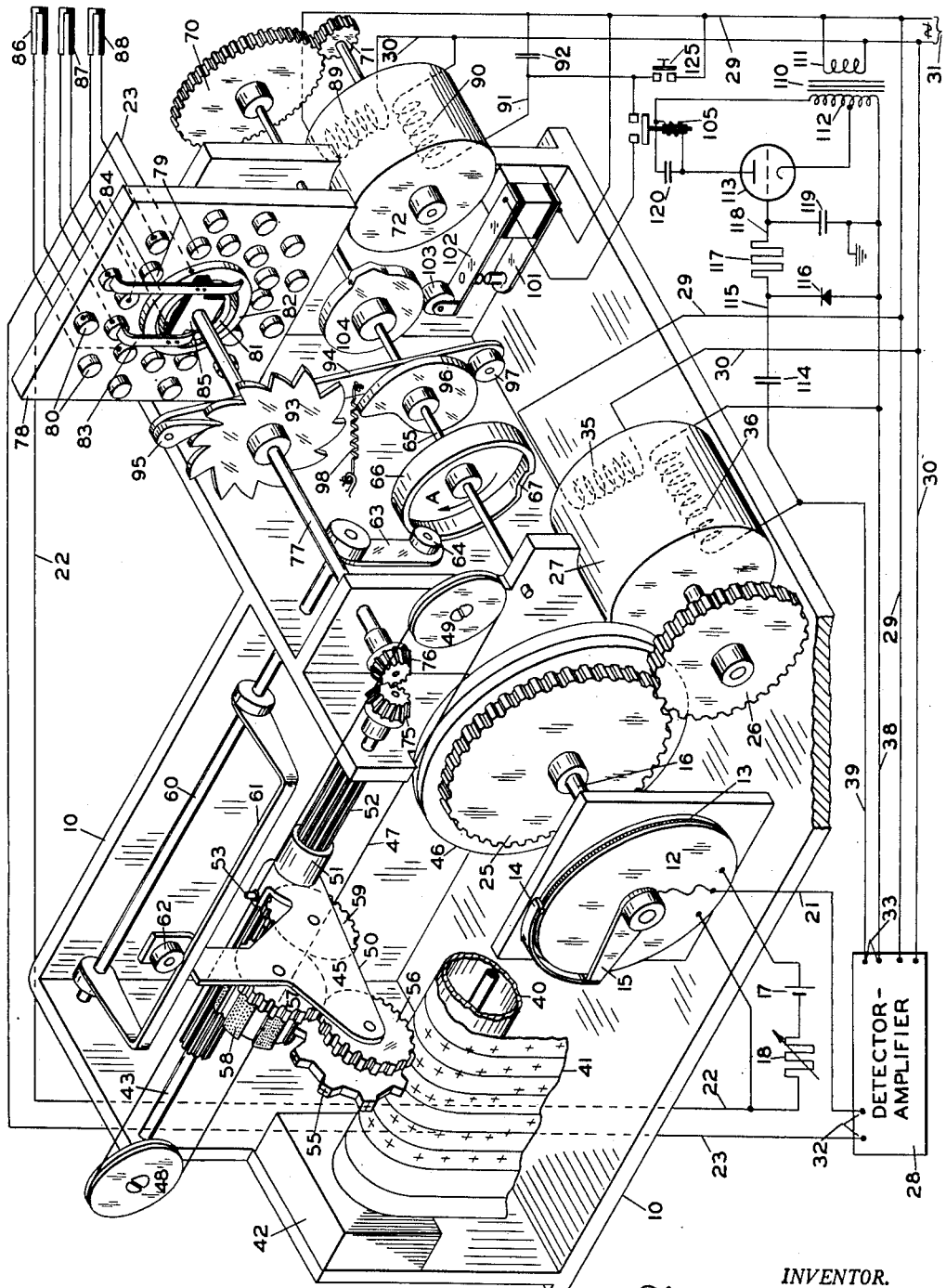
INVENTOR.
Clinton A. Blakeslee
BY
E. C. Sanborn
Attorney Patented Feb. 10, 1953

2,628,149

UNITED STATES PATENT OFFICE 2,628,149

MULTIPLE-POINT MEASURING INSTRUMENT

Clinton A. Blakeslee, Waterbury, Conn., assignor to The Bristol Company, Waterbury, Conn., a corporation of Connecticut Application August 17, 1948, Serial No. 44,625

6 Claims. (Cl. 346—32)

This invention relates to measuring instruments of the sequential class, and more especially to self-balancing potentiometers, bridges, and the like, wherein measurements are successively performed on the magnitudes of a plurality of conditions; these magnitudes being suitably exhibited to a common scale, as for example, by recording them with distinctive markings, and to suitable coordinates, on a paper chart. In recording instruments of this class there must necessarily elapse an interval of time between the instant one record is made and that when the succeeding record is made, during which interval the measuring mechanism is engaged in positioning the printing or recording element at the proper location with respect to the chart. During this interval, also, and usually immediately after the recording mechanism is brought into engagement with the chart, switching means is actuated to transfer the measuring circuit from one to another of the several magnitudes to be determined, and at the same time to shift the marking element of the recording mechanism to a new and distinctive symbol corresponding to the individual magnitude under measurement.

In the most common recording instrument of this class, it is customary for the printing and switching mechanism to be advanced periodically at uniform intervals of time, the duration of these intervals being made such as to allow the balancing, or recorder-positioning mechanism to attain a condition of complete balance, corresponding to a true measurement of the instantaneous value of the magnitude, before the printing or recording operation takes place. It will be realized that if the time interval is made sufficiently great to permit balancing after the maximum displacement which the recording mechanism may be required to take, there are likely to be a number of cycles of operation wherein a condition of balance is established, and the mechanism held in readiness to perform its recording function, an appreciable time before lapse of the pre-established interval. Thus the over-all speed of operation is restricted and the number of printing operations which can be accomplished in a given time is limited by the unchanging value of the established time interval.

It is an object of the present invention to provide a multiple printing recorder, wherein, immediately upon the recording mechanism attaining a position corresponding to the measured magnitude, the recording function will be completed, and a measurement of the succeeding value undertaken without further delay.

It is a further object to provide a multiple-printing recorder of the class having a dial-switch or its equivalent for providing selective connection between a plurality of electrically sensitive elements and a single measuring circuit, and in which the switching and multiple-printing mechanism may at will be rotated or manually positioned to facilitate inspection or cleaning of the contacts or other parts of said mechanism.

It is a further object to provide an instrument of the above type wherein manipulation of said mechanism may be effected with or without the instrument in operation, and in which said manipulation will introduce no disruption of the normal sequence of switching and printing functions or interference with register between said functions.

It is a further object to provide a recorder of the above nature, wherein the multiple recording function may at will be discontinued and the instrument caused to indicate a magnitude measured at one point only.

It is a further object to provide a recorder of the above nature, readily subject to such modification that failure of the instrument to balance at one particular point will not interfere with recording at the other points by indefinitely suspending operation, but will only introduce a readily identifiable delay corresponding to that point, thus facilitating identification of the source of trouble.

It is a further object to provide a multiple-point measuring instrument of the sequential type wherein upon failure of the exhibiting member thereof to attain a position representative of the measured magnitude at the time in its operating cycle when the exhibiting member should perform its function, there will be superimposed upon the normal operation of the instrument a characteristic performance function serving as a signal that such failure has occurred and assisting in identifying the source of the failure.

In carrying out the purposes of the invention, it is proposed to provide a recorder of the class under consideration, in which, after a printing operation is effected, the switching means will be at once transferred to the succeeding magnitude to be measured, the printing mechanism held in readiness to make its record upon the chart, and there maintained until a condition of balance is established, whereupon printing is immediately effected, and the cycle carried out as before. It is proposed to effect the foregoing result by causing the printing mechanism to be operated by an electric motor, tending to advance the measuring connections and perform the printing function normally at a relatively high rate of speed but, upon the recording apparatus reaching that point of its cycle wherein it is ready to print, inhibiting the action of said motor so long as there is applied to the terminals of the balancing motor any electrical potential tending to operate the latter in either direction.

Other features of the invention will be hereinafter described and claimed.

In the drawings the single figure is an isometric representation of a multiple point recording potentiometer adapted to the purpose of thermocouple pyrometry and embodying the principles of the invention.

Referring now to the drawings:

The numeral 10 designates a base portion adapted to carry by journalling or other suitable mounting methods the several elements of a recording instrument embodying a self-balancing potentiometer for selectively measuring the potential of a plurality of thermocouples or the like, and for recording by suitable identifying indicia on an advancing paper chart the measurements so obtained.

The measuring system

Uniformly distributed about the periphery of a disk 12 is an extended slide-wire 13 having in electrical engagement therewith a slideable contact member 14 carried by an arm 15 mounted in turn upon a shaft 16 journalled in the base portion 10 concentrically with the disk 12 and adapted for rotation about the axis thereof, whereby the contact member 14 may be freely positioned at any point in the extended length of the slide-wire 13. The slide-wire 13 is energized from a battery or equivalent source of electromotive force 17 through an adjustable resistor 18, whereby the current through the slide-wire, and hence the potential gradient therealong, may be adjusted to, and maintained at, a predetermined value. Thus, according to the well-known principles of the potentiometer, the electromotive force between the contact member 14 and a selected extremity of the slide-wire, or between conductors 21 and 22 connected respectively thereto, will be proportional to the displacement of the contactor from said selected extremity, or to the angular displacement of the shaft 16 from a reference position. Conductor 21 is connected to one of the input terminals of a detecting and amplifying unit presently to be described, and conductor 22 to one side of a source of electromotive force to be measured, the measuring circuit being completed by a conductor 23 connected between the free terminal of said amplifier input and the free terminal of said source of electromotive force.

The balancing system

Angular positioning of the shaft 16 to correspond to the magnitudes of electrical potentials to be measured may be effected by any one of a number of methods well known in the art and here requiring no detailed description. For example, the shaft 16 may have affixed thereto a gear member 25 meshing with a suitable pinion 26 on the shaft of a reversible motor 27, whereby to be rotated in response to operation of said motor in either direction. Operation of the motor is rendered responsive to unbalance existing between the potential across the portion of the slide-wire 13 corresponding to the displacement of the contact member and that across the terminals of a source to be measured, either by means of a galvanometer-relay system, as fully set forth and described in U. S. Letters Patent No. 2,320,066 granted May 5, 1943, to F. B. Bristol, or by means devoid of moving parts in the detector element, as for example by the induction modulator device described in U. S. Letters Patent No. 2,444,726, granted July 6, 1948, to William H. Bussey.

Assuming the system set forth in said Bussey patent, a combined detector-amplifier element 28 energized from conductors 29 and 30 constituting an alternating-current source 31 of fixed "power" frequency is provided with input terminals 32 and output terminals 33, the former being connected to the movable contact member 14 and to one side of the source of an electromotive force to be measured, by conductors 21 and 23 respectively, as hereinbefore set forth, and the latter terminals to a winding of the motor 27 as will now be described.

The motor 27 is preferably of the two-phase class, having two windings 35 and 36, geometrically displaced from one another and adapted to energization from alernating electromotive forces of a common frequency but of a phase difference to produce in the magnetic system of said motor a rotating field, whereby to cause the pinion 26 carried by the motor shaft to be rotated in a direction depending upon the sense of phase displacement between said alternating electromotive forces.

The winding 35 of the motor 27 is connected to the conductors 29 and 30, and thereby to the source 31 for permanent energization therefrom. The winding 36 is connected by means of two conductors 38 and 39, to the output terminals 33 of the amplifier 28 for energization therefrom.

Operation of the balancing system is as follows: By the principles of the detector-amplifier system, as set forth in said Bussey patent, there will appear at the output terminals 33 an alternating electromotive force having the frequency of the source 31 and bearing thereto a phase relationship depending upon the polarity of the unidirectional potential impressed upon the input terminals 32, and dependent in amplitude upon the magnitude of said potential. The current in the motor winding 36, connected to the output terminals 33 will therefore vary in intensity and phase-position with the magnitude and polarity of the potential appearing between the conductors 21 and 23, whereby the velocity and direction of rotation of the motor 27 may be correspondingly controlled.

It is recognized that in certain types of detector-amplifier systems applicable to servomotor operation the potential applied to the control winding of the motor may at no time attain a zero value. Under such conditions, however, the residual potential will pass through a value wherein it contains no component adapted to cooperate with the normal excitation of the motor to produce rotation, whereby, in so far as concerns motor operation, the control winding may be considered as being de-energized.

Since the potential appearing between the conductors 21 and 23 represents the algebraic sum (or when the two sources are connected in opposition, the difference) of the electromotive force between the conductors 22 and 23 and that derived from the portion of the slide-wire 13 between the contact 14 and the extremity to which the conductor 22 is connected, it follows that, by a suitable selection of mechanical and electrical interconnections, the motor 27 may be caused to rotate the shaft 16 in a sense to move the contact 14 toward a position where such difference is of a zero value. In other words, a balancing action is obtained, wherein the shaft 16 and elements carried thereby continually tend to assume an angular position representative of the magnitude of the voltage appearing between the conductors 22 and 23.

The recording system

A chart-drum 40 carrying a paper strip chart 41 and adapted to be driven at a constant speed by means of a clock or equivalent time element 42 is supported from the base portion 10, whereby said chart may have inscribed thereon indicia graphically representing the values of one or more magnitudes to be measured. An extended shaft 43 journalled in the base portion 10 with its axis parallel to that of the drum 40 carries slidably mounted thereon a printing mechanism 45 presently to be described, and adapted to imprint suitable indicia upon the surface of said chart. Mounted upon the shaft 16, and rotatable therewith, is a disc 46 having wrapped about its periphery a flexible cord or cable 47 which passes around two grooved pulleys 48 and 49 positioned near the respective extremities of the shaft 43, whereby a portion of said cable will pass near the printing mechanism 45, and may be attached thereto to provide means for translating said printing mechanism to linear portions with respect to the chart 41, corresponding to angular positions assumed by the shaft 16.

The printing mechanism 45 incorporates a supporting plate member 50 having a sleeve portion 51 adapted to slide longitudinally upon an enlarged part of the shaft 43. The enlarged part of the shaft 43 takes the form of an extended pinion 52 upon which the sleeve 51 has a sliding fit. The supporting plate 50 carries a screw or other clamping means 53 to which may be secured the cable 47 for the purpose of translating the printing mechanism along the shaft 43. Rotatably mounted upon the plate 50 is a printing wheel 55 carrying suitable indicia for marking upon the chart 41, and having attached thereto a gear member 56 which in turn meshes with a similar gear member 57, also rotatably mounted on the plate 50 and carrying one or more ink pads 58 adapted to be brought into contact with the indicia upon the printing wheel 55, whereby, at a point in the rotation of said printing wheel to charge said indicia with ink of a suitable color. It will be understood that if the indicia are made of different identifying shapes the ink pads may all be of one color; and as an alternative, the indicia may all be of a common design, with the individual pads carrying inks of distinctive colors. An idler gear 59 rotatably mounted upon the plate 50, meshes with the gear 57 and with the extended pinion 52, whereby, when said pinion is rotated with the shaft 43, suitable rotary motion will be imparted to the printing wheel 55 and to said associated ink pads 58.

Journalled in the base member 10 with its axis parallel to that of the shaft 43 and horizontally displaced therefrom, is a shaft 60 adapted for angular displacement through a small angle about its axis, and carrying on a cantilever support an extended bar 61 juxtaposed to, and parallel to, the shaft 43. Carried by the mounting plate 50 is a roller or equivalent member 62 resting upon the bar 61, and subject to displacement thereby, so that, with downward or upward movement of the bar 61, the printing mechanism 50 may be displaced through a small angle to bring the indicia on the printing wheel 55 into, or out of, marking engagement with the surface of the chart 41. Angular movement of the shaft 60 is effected by means of a lever arm 63 carrying a cam follower 64, operatively engaging cam means now to be described.

Journalled within the base part 10 and adapted for continuous rotation therein, is a shaft 65 disposed with its axis perpendicular to those of the shafts 43 and 60. Mounted upon, and rotatable with, the shaft 65 is a cylindrical cam 66 having a surface portion adapted for engagement by the follower 64, and lying in a plane perpendicular to the axis of the shaft 65 with exception of a single depressed portion 67, which will be entered by the follower 64 at one position in the revolution of the cam 66, allowing the shaft 60 to be angularly deflected, correspondingly depressing the printing mechanism 45 and bringing one of the indicia on the print wheel 55 momentarily into marking engagement with the chart 41. The shaft 65 is rotated at substantially constant speed by means of a gear member 70 carried thereby and meshing with a suitable pinion 71 on the shaft of a motor 72 whose operating circuits with their connections will presently be set forth. The apparatus, as thus far described, provides means whereby the printing mechanism 45 will be positioned with respect to the chart 41 according to the magnitude of an electromotive force impressed between the conductors 22 and 23, and will be caused periodically to impress upon the chart a mark indicating its deflected position.

The multiple printing feature

The shaft 43 is provided with a bevel gear 75 meshing with a similar gear 76 upon a shaft 77 journalled in the base member 10 with its axis perpendicular to that of the shaft 43, whereby both said shafts will be rotated simultaneously and with identical axial displacements. A terminal plate 78 secured to the base part 10 is provided with two rows of insulated contacts 79 and 80 uniformly spaced about circles having a common center lying upon the axis of the shaft 77. Concentric with said circles are two continuous contact rings 81 and 82 insulatedly mounted upon the plate 78. Two conducting contact arms 83 and 84, carried by an insulating block 85 secured to, and rotatable with, the shaft 77, are adapted to bridge, the former from contacts in the circle 79 to the ring 81 and the latter from contacts in the circle 80 to the ring 82. The rings 81 and 82 are connected respectively to the conductors 22 and 23, between which the apparatus hereinbefore described is adapted to measure and record the electrical potential. The disposition of the contacts in the two rows 79 and 80 and the spacing and setting of the contact arms 83 and 84 is made such that as the shaft 77 is rotated individual contacts in the circle 79 and corresponding contacts in the circle 80 will be simultaneously connected to the rings 81 and 82 respectively and thereby to the conductors 22 and 23. The present instrument being shown in its adaptation to the measurement of temperatures, each pair of contacts simultaneously engaged by the arms 83 and 84 is connected to the terminals of a corresponding thermocouple. Thus of the three thermocouples 86, 87 and 88 shown in the drawing, the position of the contact arms 83 and 84, as indicated, is such as to place thermocouple 87 in connection with the conductors 22 and 23, whereby the temperature of said couple will be measured, and recorded on the chart 41.

The motor 72 is preferably of the so-called capacitor type having the windings 89 and 90 angularly displaced, and adapted to excitation from alternating current sources in such a manner that their magnetic effects will be out of phase, whereby to produce a rotating field with a consequent tendency for the motor shaft carrying the gear 71 to revolve in a sense dependent upon the phase relation of the currents in said windings. The winding 89 is directly connected to the conductors 29 and 30, and thereby to the alternating-current source 31, while the winding 90 has one terminal connected to the conductor 30 and the other to a conductor 91 and thence to the conductor 29 in series with a capacitor 92, whereby to effect the desired phase displacement between the currents in the two windings.

Mounted upon, and secured to, the shaft 77 is a ratchet wheel 93 having teeth corresponding in number to the pairs of contacts on the plate 78 (in the present instance, twelve). A lever-arm 94 is rotatably mounted on the shaft 77 and carries a pawl 95 adapted to engage the teeth on the ratchet wheel 93, whereby oscillatory motion of said lever-arm will cause the ratchet wheel, the shaft 77, and all parts carried thereby, as well as the shaft 43 and all parts operated by the extended pinion 52, to be advanced one increment with each oscillation of the lever-arm 94. Secured to the shaft 65 is a cam 96, preferably of the form having a spiral contour to give a gradual rise lasting for a large proportion of a single revolution, followed by a quick return. The periphery of the cam 96 is operatively engaged by a follower 97 mounted upon the arm 94 and constrained into such engagement by means of a spring 98 extended between said arm and a suitable abutment on the base 10. Thus, with each revolution of the shaft 65 in the direction indicated by the arrow A the arm 94 will make one complete oscillation, and correspondingly advance the shaft 77 and all parts mechanically operated thereby. In this manner, if the shaft 65 be continuously rotated by the motor 72, the thermocouple switching mechanism will be periodically advanced with each revolution of said shaft, and the print wheel 55 and its associated ink pad assembly 58 will be similarly advanced, so that for each thermocouple connected into the measuring circuit a corresponding one of the indicia on the print wheel will be presented to the chart 41 to impress a record thereon. The angular position of the cam 66 on the shaft 65 in relation to the cam 96 is made such that just as the follower 97 attains its highest position on the latter cam the follower 64 enters the depressed portion 67 on the former, causing the printing mechanism to be actuated and a record of the deflected position thereof, corresponding to the measured temperature of the then connected thermocouple, to be impressed upon the chart 41. Immediately after operation of the printing mechanism, the follower 64 leaves the depression 67, lifting said mechanism out of printing engagement with the chart; and immediately, under the influence of the spring 98, the follower 97 passes quickly from the highest to the lowest portion of the cam 96, causing the ratchet wheel 93 to be moved forward one tooth, and all elements operated by the shafts 77 and 43 to be correspondingly advanced, and made ready for measuring and recording the temperature of the thermocouple 88. In the continued rotation of the shaft 65, the operation of the follower 97 and lever 94 by the rising portion of the cam 96 causes the pawl 95 to slip idly over the next tooth of the ratchet wheel 93 and to engage in the notch between said tooth and its succeeding tooth, ready to shift the ratchet wheel 93 and shafts 77 and 43 through another step on further rotation of said shaft 65.

In the apparatus as thus far described, the printing is performed cyclically and at uniform intervals, requiring that the speed of the motor 72 and parts driven thereby be made sufficiently low to allow for balancing under the slowest conditions, i. e., when the measurement to be recorded differs from the previous measurement by an amount equivalent to the width of the graduated portion of the chart. Otherwise, when such broad transitions in measurement are encountered, the recording mechanism would become operative, and printing would be effected, before the attainment of a condition of balance, with a consequent error in the recorded value and possible malfunctioning of the apparatus.

The outstanding feature of the present invention resides in means for bringing the printing mechanism into readiness to record in a relatively short interval after its previous operation, and then inhibiting its action until a balance condition is attained, whereupon the record is at once made, the connections immediately established for the succeeding measurement, and the apparatus once more brought to rest to await a balanced condition. The construction and operation of this means will now be described.

*The "print-on-balance" feature*

Insulatedly mounted upon the base 10 is a pair of cooperating contact members 101 and 102, the former being stationary and the latter movable and carrying a roller or cam follower 103, whereby when said follower is suitably depressed said contact members will be brought into electrical engagement. Mounted upon and secured to the shaft 65 is a cam member 104 having a short dwell occupying only a small part of its periphery, and adapted to act upon the follower 103 to force contact member 102 into engagement with contact member 101. The cam 104 is so positioned on the shaft 65 with respect to the cams 66 and 96 that the dwell will act to close the electrical circuit between members 101 and 102 just as the follower 97 approaches the highest point of the periphery of cam 96, and immediately prior to the follower 64 entering the depression 67 on the cam 66.

A relay 105 is provided with a single pair of contacts normally open when said relay is de-energized, said contacts being connected in series with the contact members 101 and 102 between the conductors 29 and 91. It will be seen that when the relay 105 is de-energized, leaving the circuit between said conductors 29 and 91 open, the motor 72 will operate as hereinbefore set forth, and that if the relay 105 is energized at the same time as the contact members 101 and 102 are brought into electrical engagement, the capacitor 92 will be short-circuited, and the two motor windings 89 and 90 connected directly in parallel across the source 31. This will eliminate the rotating field in the motor 72 and will have the effect of applying dynamic braking, whereby the motor, if operating, will be abruptly brought to rest and locked so long as its two operating windings continue to be energized directly from the common source. The relay 105 is adapted to be energized, and to hold its contacts closed so long as the measuring circuit remains in an unbalanced condition, as represented by the existence at the terminals 33 of the unit 28 of a potential suited to operation of the motor 27. Suitable operation of the relay 105 in response to said potential may be obtained by the electronic circuit now to be described.

A transformer 110 having a primary winding 111 connected across the source 31, and a secondary winding 112, is provided for the purpose of energizing the relay 105 through a triode 113. One end of the secondary winding 112 is connected to the conductor 38 and thereby to one side of the output of the detector-amplifier 28, and said conductor is maintained at "ground" potential. Conductor 39 is connected through a capacitor 114 to a conductor 115 and thereby to the cathode of a rectifier 116, whose anode is connected to the conductor 38. It will be seen that an alternating potential between the conductors 38 and 39 will tend to maintain the conductor 115 positive in relation to the conductor 38, the capacitor 114 acting as a blocking condenser to prevent direct current feeding back into the detector-amplifier 28. The conductor 115 is connected through a resistor 117 to a conductor 118, which conductor is connected to the control grid of the triode 113 and also through a capacitor 119 to the conductor 38, said resistor and capacitor being proportioned to form a filtering network whereby to minimize the alternating component of the potential impressed upon the control grid of the triode. The cathode of the triode 113 is connected to a tap on the secondary winding of the transformer 110, whereby to maintain said cathode at a suitable alternating potential with respect to the conductor 38. The anode or plate of the triode 113 is connected through the operating winding of the relay 105 to the free terminal of the secondary winding 112, said operating winding being shunted by a capacitor 120.

Operation of the electronic relay system is as follows: Assuming first that no potential exists between the conductors 38 and 39, the grid of the triode 113 will be at substantially ground potential. The triode 113 will tend to become conductive only during those portions of the cycle when the anode is positive with respect to the control grid. The voltage of the transformer tap to which the cathode of the triode is connected is selected, or adjusted, to have value sufficient to prevent the triode passing current during those half-cycles when it might normally become conducting. Thus, a current of zero, or negligible value, will flow in the winding of the relay 105, with the result that the latter will remain de-energized, and its contacts will stand in an open position. If, as hereinbefore mentioned as a possibility, the potential between the conductors 38 and 39 corresponding to a condition of balance in the potentiometer circuit is other than zero, the predominating part of this potential may be neutralized by modifying the selected position of the tap taken from the secondary winding 112 of the transformer 110 to the extent that when said balance condition exists the relay 105 will be de-energized.

Assuming, now, that there be impressed between the conductors 38 and 39 an alternating potential substantially greater than that corresponding to a balance condition, the rectifier 116 will tend to maintain the conductor 115 positive with respect to the conductor 38, the capacitor 114 preventing the unidirectional potential from being impressed upon the output terminals of the unit 28. Thus, the capacitor 119 will acquire through the resistor 117 a charge, tending to maintain the conductor 118 positive with respect to the conductor 38, and impress a positive potential upon the control grid of the triode 113. The capacitor 119 will provide a return path for an alternating component which may appear in said potential. The control grid having acquired a positive bias with respect to the cathode of the triode, the blocking effect of the potential derived from the tapped portion of the secondary winding 112 will be more or less neutralized, with the result that a unidirectional current will flow in the output circuit of the triode, including the main portion of the secondary winding 112 and also the operating winding of the relay 105. The capacitor 120 in parallel with the relay winding will serve to bypass the alternating component of said current and render the relay responsive to the unidirectional component produced by the rectifying action of the triode 113. Thus, so long as there exists a potential on the output terminals 33 of the unit 28, the relay 105 will be energized and its contacts closed.

Assuming the motor 72 to be running in a normal manner, causing the shaft 65 and parts carried thereby to rotate, and at the same time a condition of unbalance to exist in the measuring circuit, the output potential of the unit 28 impressed upon the winding 36 of the motor 27 will also be impressed upon the electronic relay system causing the contacts of relay 105 to be closed. As, with rotation of the shaft 65, the cam member 104 rotates to a position where it actuates the contact member 102 to engage the contact member 101, a complete circuit will be provided through said contacts and those of the relay 105 to bring the motor 72 to rest, and to lock it in a position corresponding to that attained by the recording mechanism immediately prior to the printing operation. Thus, printing action will be suspended while the balancing action continues; and this condition will remain until balancing has been completed, at which time the output voltage at the terminals 33 will attain a zero (or a minimum) value. The positive bias will then disappear from the control grid of the triode 113 with the result that the triode will cease to conduct, and the relay 105 will be released, separating its contacts and opening the circuit between the conductors 29 and 91. The motor 72 will thus revert to its normal operating condition and the shaft 65 will begin to rotate, whereupon the printing mechanism will at once be actuated, and the contacts of the thermocouple switch shifted to the succeeding couple of the group under measurement. Thus it will be seen that, if a condition of balance in the measuring system exists at the time the cam 104 actuates its associated contacts, the motor 72 will continue to run and recording of the measured temperature will at once be effected. If, on the other hand, a balance has not been attained, action of the recording mechanism will be inhibited and the printing operation delayed until the position of said mechanism with respect to the chart 41 correctly represents the temperature being measured. Persistence of this delay beyond the maximum time when recording should occur, for a change in successive magnitudes under measurement, serves as a signal that the instrument is not operating properly; and a check of the position of the recording mechanism at which the delay takes place, will serve to identify the circuit and the sensitive element where the fault is most likely to be located.

As a means for stopping the transferring mechanism at will in any desired position, whereby to inspect or to clean the contacts carried by the plate 78, or the coacting arms 83 and 84, or to cause the printing mechanism to record repeatedly the magnitude as measured at a single selected point, there may be provided a manually actuated switch 125 having its contacts connected between the conductors 91 and 29. Thus, upon closing said contacts, the capacitor 92 will be short-circuited, and the motor 72, together with all elements of mechanism driven thereby, brought to rest.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a multiple-point measuring instrument, a balanceable electrical network connectible successively to a plurality of sensitive members respectively associated with sources of magnitudes to be measured, means responsive to unbalance of said network, motor means controlled by said responsive means for balancing said network, exhibiting means for providing indications of said magnitudes to a common set of ordinates upon a common scale, switching means for connecting said network successively to said sensitive members, connections between said motor means and said exhibiting means whereby the latter is positioned by said motor means with respect to said scale in correspondence with the magnitude under measurement, a second motor means for intermittently actuating said switching means, circuit-controlling means intermittently actuated by said second motor means, and relay means having connections to said means responsive to unbalance of said network for actuation of said relay when said network is unbalanced, said relay having contacts connected to said circuit-controlling means and to said second motor means for modifying the operation of the latter when said circuit controlling means and said relay means are concurrently actuated.

2. In a measuring instrument, a balanceable electrical network connectible to a sensitive element responsive to a magnitude to be measured, means responsive to unbalance of said network, motor means controlled by said unbalance-responsive means for balancing said network, exhibiting means for providing an indication of said magnitude, connections between said motor means and said exhibiting means whereby the latter is positioned by said motor means in correspondence with the magnitude under measurement, a second motor means, means operable intermittently by said second motor means for rendering said exhibiting means effective to provide said indication, circuit-controlling means periodically actuated by said second motor means, and relay means having connections to said unbalance-responsive means for actuation of said relay means when said network is unbalanced, said relay means also having connections to said circuit-controlling means and to said second motor means for modifying the operation of the latter when said circuit-controlling means and said relay means are concurerntly actuated.

3. In a measuring instrument, exhibiting means for providing an indication of the magnitude of a condition, motor means for positioning said exhibiting means, means responsive to the magnitude of said condition for controlling said motor means to position said exhibiting means in correspondence with said magnitude, a second motor means, means operable intermittently by said second motor means for rendering said exhibiting means effective to provide said indication, circuit-controlling means periodically actuated by said second motor means, and relay means actuated concurrently with the first motor means, said relay means also having a connection to said circuit-controlling means and to said second motor means for modifying the operation of the latter when said circuit-controlling means and said relay means are concurrently actuated.

4. A multiple-point instrument comprising, in combination, a balanceable electric measuring network, switching means for connecting the latter successively to a plurality of members electrically responsive to magnitudes to be quantitatively determined, exhibiting means for providing measures of said magnitudes to a common set of ordinates upon a common record medium, an electric motor for balancing said network and concurrently positioning said exhibiting means with respect to said medium in correspondence with the magnitude under measurement, a second electric motor for actuating said switching and exhibiting means, circuit-controlling means actuated by said second motor, relay means, means responsive to the condition of balance of said network for energizing said first motor and operating said relay means, and means connecting said relay means to said circuit controlling means and to said second motor for modifying the operation of the latter when the said circuit controlling means and said relay means are concurrently actuated.

5. A self-balancing measuring and recording instrument, comprising in combination, a balanceable electric measuring network, including relatively movable elements, means for connecting to said network a source of voltage to be measured, an electric motor for producing relative movement between said elements for balancing said network, means for controlling said motor to effect balancing of said network in response to unbalance thereof, recording mechanism to be actuated when said network is balanced, a second motor for actuating said recording mechanism to effect a record of said voltage, relay means controlling said second motor, and means connected to said relay means and to said controlling means for said first motor for modifying the energization of said second motor to an operative condition for actuating said mechanism or to a condition of rest with dynamic braking, according to whether said first motor is de-energized or energized, respectively.

6. A self-balancing measuring and recording instrument, comprising in combination, a balanceable electric measuring network, including relatively movable elements, means for connecting to said network a source of voltage to be measured, an electric motor for producing relative movement between said elements for balancing said network, means for controlling said motor to effect balancing of said network in response to unbalance thereof, recording mechanism to be actuated when said network is balanced, a second motor for actuating said recording mechanism to effect a record of said voltage, relay means controlling said second motor, an actuating circuit for said relay means connected to said first motor for energization concurrently with the latter, and means comprising a circuit having contacts controlled by said relay means and connected to said second motor for placing the latter in operation when said first motor is deenergized, said circuit having means for inhibiting operation of said second motor and applying dynamic braking thereto under control of said relay means when said first motor is energized.

CLINTON A. BLAKESLEE.

REFERENCES CITED

The following references are of record in the file of this patent:

UNITED STATES PATENTS

| Number | Name | Date |
| --- | --- | --- |
| 965,754 | Schantz | July 26, 1910 |
| 1,784,522 | Harrison | Dec. 9, 1930 |
| 2,125,345 | Hunt | Aug. 2, 1938 |
| 2,191,673 | Moore | Feb. 27, 1940 |
| 2,278,409 | Armbruster | Apr. 7, 1942 |
| 2,358,243 | Moore | Sept. 12, 1944 |
| 2,392,916 | Gruss | Jan. 15, 1946 |
| 2,425,080 | Blakeslee | Aug. 5, 1947 |
| 2,428,129 | Smith | Sept. 30, 1947 |
| 2,479,153 | Buss | Aug. 16, 1949 |